United States Patent
Watanabe et al.

(10) Patent No.: US 6,798,896 B2
(45) Date of Patent: Sep. 28, 2004

(54) IMAGE INPUT APPARATUS (75) Inventors: Mitsuru Watanabe, Tokyo (JP); Satoshi Shingu, Tokyo (JP); Masato Iwakawa, Tokyo (JP)

(73) Assignee: NEC Corporation (JP)

(*) Notice: Subject to any disclaimer, the term of this patent is extended or adjusted under 35 U.S.C. 154(b) by 553 days.

(21) Appl. No.: 09/792,192

(22) Filed: Feb. 22, 2001

(65) Prior Publication Data

US 2001/0019619 A1 Sep. 6, 2001

(30) Foreign Application Priority Data

Mar. 2, 2000 (JP) ........................................ 2000-057537

(51) Int. Cl.$^7$ ................................................ G06K 9/00
(52) U.S. Cl. .................... 382/101; 382/165; 382/167
(58) Field of Search ................................ 382/101, 165, 382/167

(56) References Cited

U.S. PATENT DOCUMENTS

| | | | | |
|---|---|---|---|---|
| 4,951,097 A | * | 8/1990 | Oguchi et al. | 382/128 |
| 5,274,417 A | * | 12/1993 | Yamaguchi | 355/30 |
| 5,737,438 A | * | 4/1998 | Zlotnick et al. | 382/101 |
| 5,786,934 A | * | 7/1998 | Chiu et al. | 359/494 |
| 5,912,698 A | * | 6/1999 | Graulich et al. | 348/91 |
| 6,466,339 B1 | * | 10/2002 | Rottner et al. | 358/474 |

FOREIGN PATENT DOCUMENTS

| | | | |
|---|---|---|---|
| JP | 59-23860 | * | 2/1984 |
| JP | 62-272745 | | 11/1987 |
| JP | 63-151261 | | 6/1988 |
| JP | 02-087872 | | 3/1990 |
| JP | 02-131078 | | 5/1990 |
| JP | 04-068868 | | 3/1992 |
| JP | 4-46763 | | 4/1992 |
| JP | 04-46763 | * | 4/1992 |
| JP | 04-265182 | | 9/1992 |
| JP | 04-318758 | | 11/1992 |
| JP | 05-122519 | | 5/1993 |
| JP | 05-227428 | | 9/1993 |
| JP | 06-189132 | | 7/1994 |
| JP | 06-205162 | | 7/1994 |
| JP | 09-131573 | | 5/1997 |
| JP | 09-153984 | | 6/1997 |
| JP | 09-321953 | | 12/1997 |
| JP | 10-023227 | | 1/1998 |
| JP | 10-257313 | | 9/1998 |
| JP | 11-027525 | | 1/1999 |

OTHER PUBLICATIONS

Japanese Office Action issued Sep. 16, 2003 (w/English translation of relevant portion).
Japanese Office Action issued Apr. 13, 2004 (w/English translation of relevant portions).

* cited by examiner

*Primary Examiner*—Daniel Mariam
*Assistant Examiner*—Shefali Patel
(74) *Attorney, Agent, or Firm*—Dickstein, Shapiro, Morin & Oshinsky, LLP.

(57) ABSTRACT

The present invention enables to increase the speed of recognizing characters on an undefined-size postal matter such as a flat mail. The flat mail often has an address area different in color or pattern from the flat mail itself. The present invention provides an image input apparatus including pickup means of monochromatic-mode CCD 31 having a fine resolution capable of recognizing characters and pickup means of color-mode CCD 30 having a rough resolution only sufficient for detecting an address area. These pickup means are mounted in a unitary block so that images are taken in from approximately identical positions and a color image is used to detect an address area and a monochromatic image is used to recognize characters, thereby significantly increasing the speed of flat mail classification. An illumination unit 44 is forcibly cooled so as to enable to use a large-output lamp tube 75 capable of illuminating a wide range to assure the character recognition.

21 Claims, 11 Drawing Sheets

IMAGE INPUT APPARATUS

BACKGROUND OF THE INVENTION

1. Field of the Invention

The present invention relates to an image input apparatus and in particular, to an image input apparatus for inputting a monochromatic image and a color image of a portion of a postal matter to which light is applied from a light source, thereby recognizing the postal matter for the area division.

2. Description of the Related Art

This type of image input apparatus is generally mounted on a so-called flat apparatus for recognizing postal matters having a size out of a predetermined range (hereinafter, referred to as a flat mail classification apparatus). The conventional flat mail classification apparatus uses an image input apparatus for reading an entire image on a flat mail surface as a monochromatic image of a fine resolution capable of recognizing characters, so that an address is recognized from the image information for the area division of the flat mail.

However, a flat mail has a large area to be processed as compared to a normal mail size and it is often a case that a complicated design or characters are printed beside the address. Accordingly, when a format of a high resolution is used, the information amount of the monochromatic image becomes enormous, requiring a plenty of time for recognizing only the address from that information.

SUMMARY OF THE INVENTION

It is therefore an object of the present invention to provide an image input apparatus for use in a flat mail classification apparatus for detecting an address area by using a color information and performing a character recognition to that area, thereby enabling to obtain a high-speed flat mail classification.

The present invention provides an image input apparatus comprising: feed means for feeding an object in a constant direction; illumination means having a light source for applying light rays toward the object fed by the feed means in the constant direction and a filter for cutting heat rays from the light source while allowing visible light rays to pass through; monochromatic and color pickup means for picking up the object illuminated by the light rays with a linear field of view intersecting the feed direction; and cooling means for forced cooling by generating an air flow between the illumination means, the light source, and the filter, wherein the monochromatic pickup means has a high resolution appropriate for a character recognition and the color pickup means has a low resolution appropriate for a character area detection.

Images are taken in from the same position by the monochromatic pickup means having a fine resolution sufficient for a character recognition and the color pickup means having a rough resolution sufficient for an address area detection. The address area is detected by the color image and a character recognition process is performed only to that area by using the monochromatic image of the high resolution, thereby enabling to obtain a high-speed character recognition, increasing the speed of the flat mail classification. The address area often has a color different from the flat mail itself or other pattern. Accordingly, the address area detection based on the rough color information is advantageous.

Moreover, since the illumination means is provided with the cooling means for forcibly cooling the light source and the filter by generating an air flow, it is possible to use a high-output light source accompanied by heat rays, reducing the CCD exposure time for assuring the necessary S/N ratio. This further increases the speed of the flat mail classification. Furthermore, since it is possible to obtain a sufficient illumination depth of luminance, it is possible to cope with flat mails having different thickness values.

Especially when the illumination means 1 is realized by a single unit, it is preferable that the illumination means, the feed means, and the pickup means be arranged in such a manner that the illumination unit has its optical axis forming an acute angle against the feed direction of the feed means and the angle is different from an angle defined by the optical axis of the monochromatic and color optical axis of the pickup means and the feed direction of the feed means.

This provides an advantage that it is possible to prevent halation caused by the light rays from the illumination means which is mirror-reflected directly from an object on the feed means to be introduced into the pickup means.

Moreover, when the illumination means is realized by two illumination units, they are arranged so as to sandwich the linear field of view of the pickup means.

Similarly as described above, it is possible to prevent halation caused by the light rays from the illumination means which is mirror-reflected directly from the object on the feed means and introduced into the pickup means.

The illumination means may use as the light source a high pressure sodium lamp.

Although the high-pressure sodium lamp is accompanied by heat rays, the heat rays may be removed by a heat ray cut filter and the heated lamp itself can be sufficiently cooled by an air flow.

The pickup means preferably has the monochromatic optical path and the color optical path which are approximately vertical to the feed direction of the feed means and are positioned in the proximity to each other along the feed direction of the feed means.

When the monochromatic optical path is in the proximity to the color optical path, it is possible to reduce an address area detection error to a value that can be ignored. This eliminates need to perform an operation required for matching the fields of view of the monochromatic image and the color image taken in, thereby enabling to perform a character recognition based on the address area detection at an increased speed.

Furthermore, it is possible to constitute the configuration such that the pickup means has its monochromatic optical path and color optical path which are overlapped in the first half of the optical path from the pickup surface to the focusing means and then branched by optical path branching means so as to be introduced to monochromatic focusing means and color focusing means of the pickup means, respectively.

Moreover, the pickup means may include a plurality of mirrors for refracting the optical paths so as to prolong both of the chromatic optical path and the color optical path within a limited space.

When the optical path is prolonged, it is possible to suppress magnification fluctuations caused by movement of the pickup surface, thereby enabling to cope with flat mail thickness fluctuation, which in turn improves the character recognition accuracy.

Furthermore, the pickup means preferably includes a polarization filter and a infrared ray cut filter which are arranged in the monochromatic optical path, and a color correction filter, a polarization filter and an infrared ray cut filter which are arranged in the color optical path.

The polarization filter removes the mirror reflection from a flat mail wrapped in a material easily causing a mirror reflection such as vinyl and increases the substantial contrast of the image to improve the character recognition accuracy. Moreover, the infrared ray cut filter cuts off near infrared rays remaining in the reflected light and increases the contrast of characters written with ink such as a ball-point pen, thereby improving the character recognition accuracy. Furthermore, the color correction filter serves for rough correction of the color balance.

The pickup means has its monochromatic field of view and color field of view having an identical width, and only their resolutions are different.

More specifically, the monochromatic pickup means has a high resolution appropriate for a character recognition while the color pickup means has a resolution low but sufficient for an address area detection. This enables to reduce the processing time required for the address area detection and the character recognition as well as to improve the character recognition accuracy.

The pickup means preferably includes independent focusing means, photo-electric conversion means, video signal processing means, and image data transfer means for each of the monochromatic pickup and the color pickup.

This configuration enables to perform the image processing of the monochromatic image and the color image substantially simultaneously, thereby enabling to reduce the processing time required for the address area detection and the character recognition. This significantly increases the flat mail classification work.

The photo-electric conversion means includes a linear array CCD consisting of light receiving elements arranged in a straight line for monochromatic image pickup and a linear array CCD consisting of light receiving elements arranged in a straight line for color image pickup, and further includes shading means for shading a part of the monochromatic and color linear array CCD.

Thus, by shading a part of the monochromatic and color linear array CCD, it is possible to obtain pickup means having a linear field of view by utilizing ordinary linear array CCD available on market. Moreover, by performing pickup with a linear field of view, it is possible to reduce the data transfer amount and increase the speed of the entire processing flow. It should be noted that in principle a portion of the CCD which is transferred later is shaded.

Moreover, the monochromatic-mode video signal processing means may include envelope detection means and analog/digital conversion means; and the color-mode video signal processing means includes analog/digital conversion means and image correction means.

The envelope detection means detects a background luminance as a reference level so as to digitize the monochromatic image. This enables to obtain a clear image by substantially eliminating the illumination irregularities due to the illumination means and the exposure shortage (shading) at a peripheral portion of the lens, thereby improving the character recognition accuracy. Moreover, the color-mode vide signal processing means is provided with the image correction means for performing a correction process to the image data converted into a digital data. This enables to perform the light distribution correction and the white correction (white balance adjustment), thereby assuring the address area detection.

Furthermore, the envelope detection means may include correction means for correcting distortion of a video signal when the object caused mirror reflection.

This correction means includes: a function to detect a luminance increase of a background due to a mirror reflection of an object and to reduce a time constant of the envelope and a function to detect that the background luminance has returned to a normal state and return the time constant of the envelope to a previous state. When a mirror reflection is caused in the object to increase the luminance, the reference level is increased to compress the contrast, which is disadvantageous for character recognition. However, since this period of time can be reduced by reducing the time constant, it is possible to improve the character recognition accuracy as a whole.

Moreover, the image correction means for color pickup may include correction data generation means for calculating a correction data with respect to a reference signal which has been converted into a digital signal by the photo-electric means and the analog/digital conversion means using a reference plate as the object and writing the calculation result into a storage device.

This enables to maintain correction data related to the light distribution correction and the white correction, thereby eliminating need to frequency calculate correction data. Thus, it is possible to significantly improve the entire work efficiency. In order to always have an optimal correction data, it is preferable to periodically calculate the correction data and write the calculation result in a storage device.

Furthermore, the image correction means for the color pickup may include correction data read-out means for reading out the correction data from the storage device using the object image data which has been converted into a digital signal by the analog/digital conversion means, as a part of an address value of the storage device.

With this configuration, it is possible to read out a correction data from the storage device, corresponding to an address of the object image data, i.e., a portion of the pickup image. This enables to automatically perform image corrections such as the light distribution correction and the white correction.

The correction data generation means includes a calculation function to perform a smoothing process to remove stains on the reference plate and noise of a circuitry from the reference signal for a curve approximation process of the illumination light distribution characteristic and to unify the reference values after the correction for respective colors, thereby simultaneously performing the light distribution correction and the white correction.

With this function, it is possible to eliminate noise caused by stains on the reference plate, irregularities of the CCD sensitivity and the light reception characteristics, aberrations of the optical system arranged in the pickup means, and the like, thereby enabling to obtain an appropriate correction data.

Moreover, the calculation function may include an error detection function for detecting irregularities of the light distribution characteristic obtained by the curve approximation to detect an error of the reference plate and the circuitry and output an error signal.

With this error detection function, it is possible to detect a significant failure in the reference plate and the circuitry, thereby preventing an error due to use of an improper correction data.

The smoothing process for noise removal may be performed by a median processing and the curve approximation process of the light distribution characteristic may be performed by a three-dimensional spline interpolation.

DESCRIPTION OF THE PREFERRED EMBODIMENTS

Description will now be directed to preferred embodiments of the present invention with reference to the attached drawings. Firstly, explanation will be given on a first embodiment in which both of a monochromatic optical path and a color optical path of pickup means are arranged approximately orthogonal to the feed direction of feed means and in proximity to each other along the feed direction of the feed means, with reference to FIG. 1 to FIG. 10.

Figure 1:
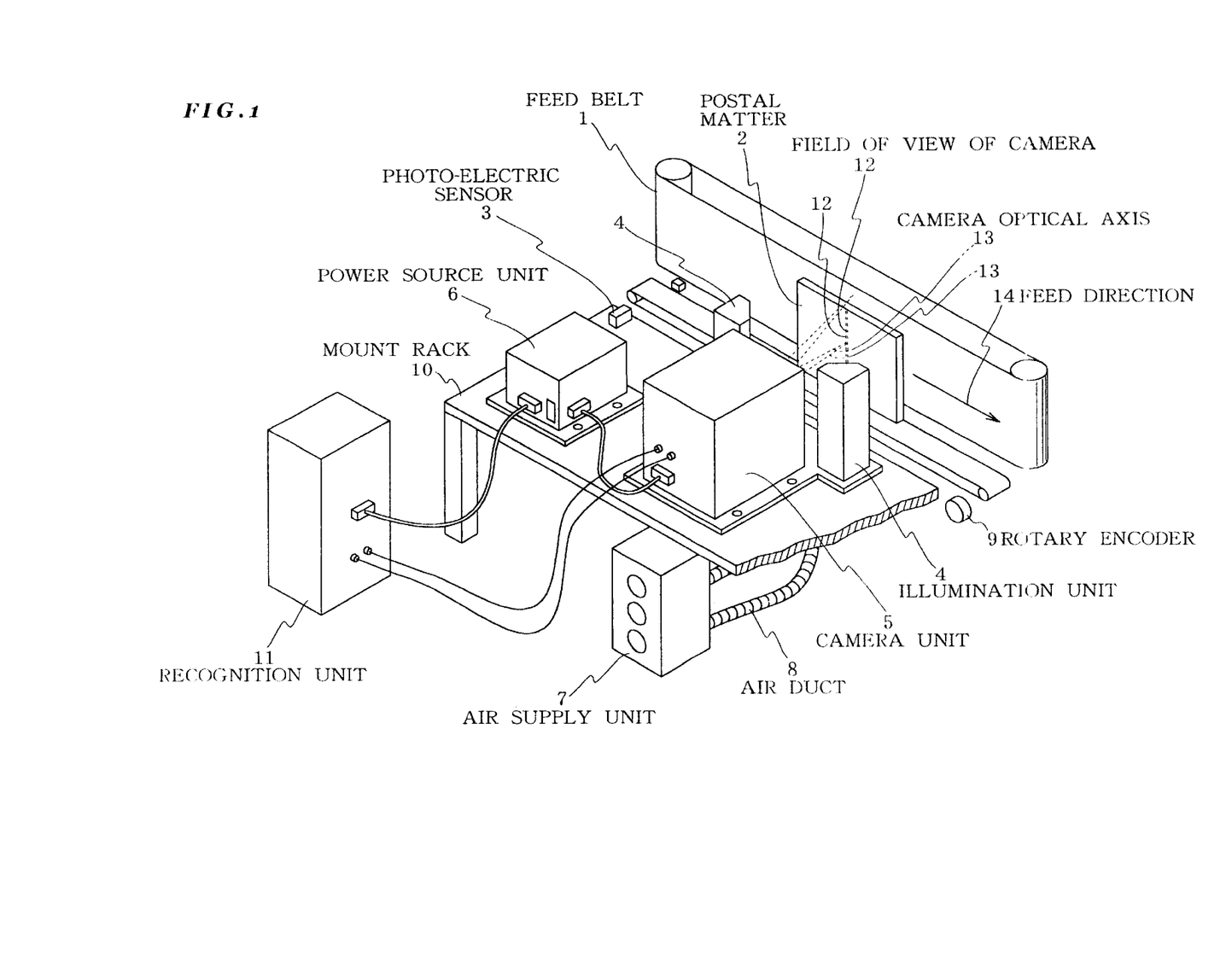
FIG. 1 is a perspective view of a configuration of a first embodiment of the present invention.

In FIG. 1, a postal matter 2 such as a flat mail is placed on a feed belt 1 and moved at a constant speed. A photo-electric sensor 3 detects a passing of a tip end of the postal matter 2 and outputs the detection signal via a power source unit 6 to a recognition unit 11. A rotary encoder 9 generates a pulse having a period proportional to the speed of the feed belt 1 and outputs the pulse to the power source unit 6. A movement amount of the postal matter 2 after passing the photo-electric sensor 3 is recognized by the number of pulses output from the rotary encoder 9. More specifically, the image taken-in start timing is set in advance as a predetermined number of output pulses from the rotary encoder 9. A counter is reset upon detection of passing of the postal matter 2. When the counter has counted the aforementioned set value, an image take-in signal is output from the power source unit 6 to the recognition unit 11. An air supply unit 7 supplies air for cooling via an air duct 8 to the illumination unit 4 and to a camera unit 5. The illumination unit 4 as the illumination means applies an intense light ray over the entire surface of the postal matter 2. The illumination unit 4 is specifically realized by two units arranged to sandwich a monochromatic and color camera field of view 12.

Figure 2:
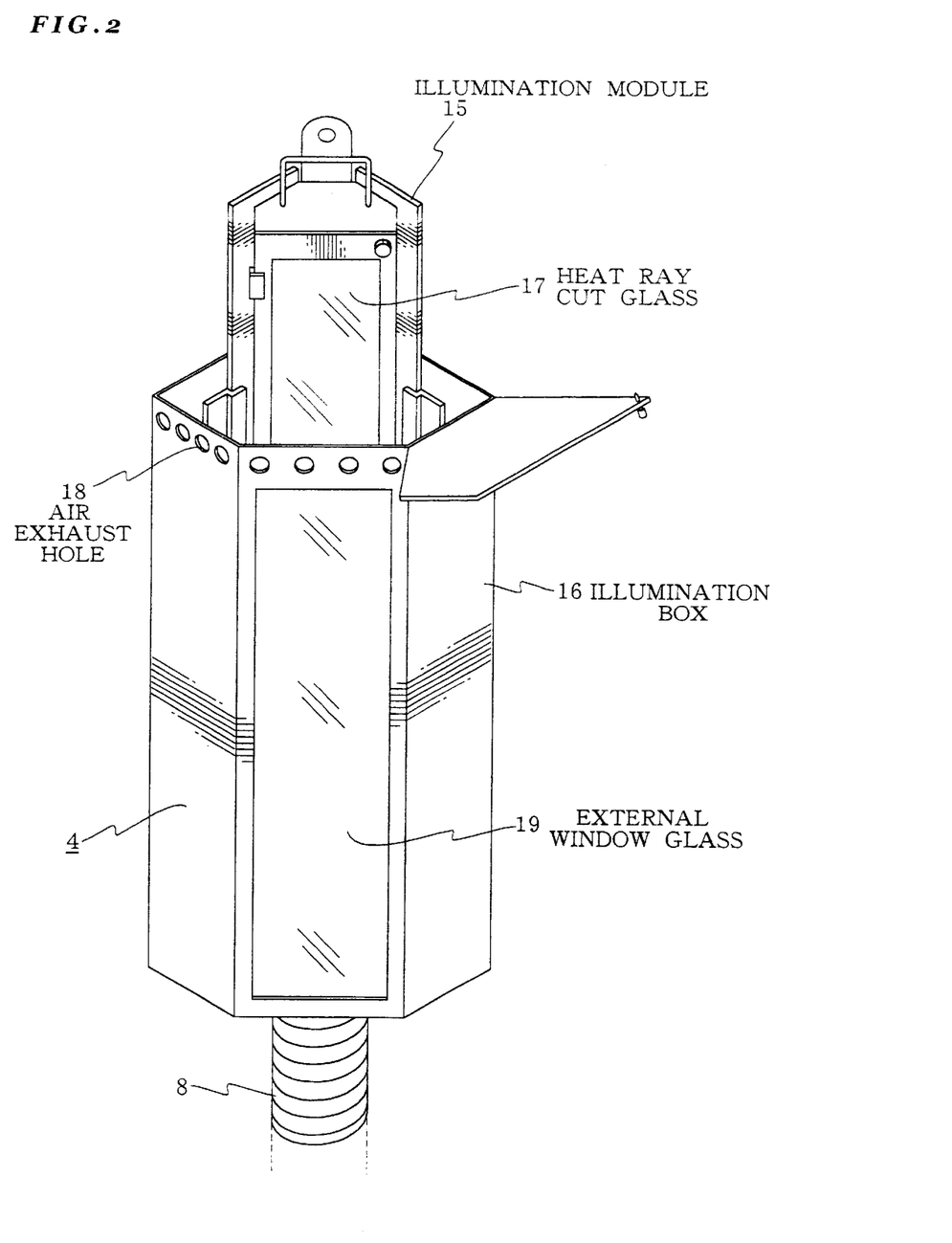
FIG. 2 is a perspective view showing a configuration of an illumination unit of FIG. 1.

Here, explanation will be given on the configuration of the illumination unit 4 with reference to FIG. 2. The illumination unit 4 includes an illumination module 15 having a built-in light source and an illumination box 16. The air for cooling is supplied into this illumination box 16 from the air supply unit 7 of FIG. 1 via the air duct 8, so as to cool the light source in the illumination module, the atmosphere, and a heat ray cut glass 17 arranged in front of the light source. The cooling air is exhausted from air exhaust holes 18. The heat ray cut glass 17 serves as a filter having a uniform and preferable transmittance in the visible range and a transmittance almost 0 in the range from the near infrared rays to the infrared rays. Thus, lowering of the luminance of the light applied to the feed belt 1 is suppressed to a possible minimum value and the heat ray application is reduced.

An external glass 19 has a uniform and preferable transmittance in the range from the visible rays to the infrared rays and will not absorb remaining heat rays transmitting through the heat ray cut glass 17. That is, the external glass 19 itself is not heated and there is no danger of seizure by external dusts or deterioration of durability by an external shock.

Figure 3:
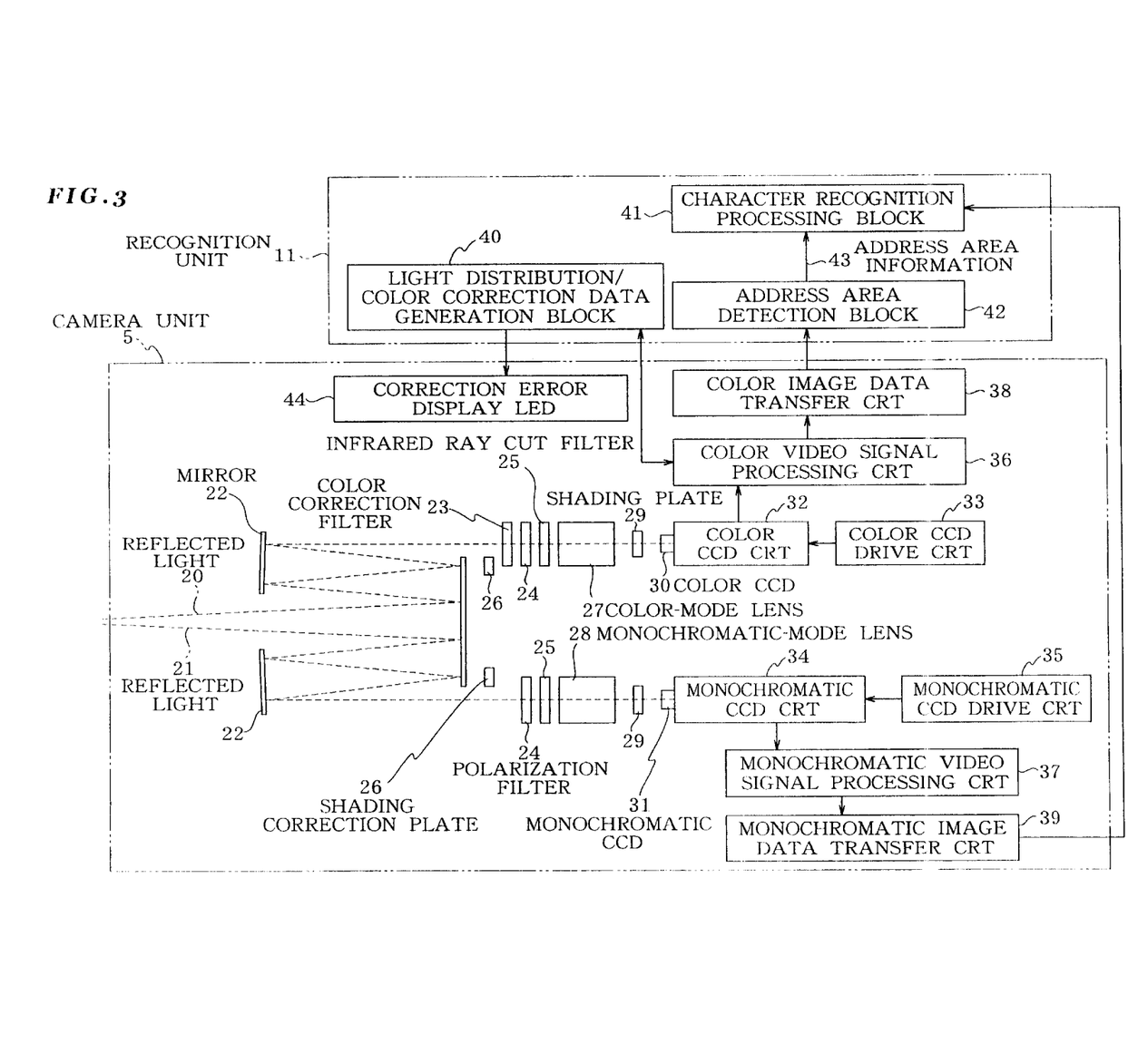
FIG. 3 is a block diagram showing an outline of a circuit configuration of FIG. 1.

Next, with reference to FIG. 3, explanation will be given on a circuit configuration of the first embodiment of the present invention. As shown in FIG. 3, the camera unit 5 as the pickup means has a configuration as follows with respect to the reflected light 20 and 21 from the surface of the postal matter 2.

For the reflected light 21, the camera unit 5 includes: a monochromatic linear ray type CCD 31 for receiving an image focused by a monochromatic-mode lens 28; a CCD circuit 34 for photo-electric conversion; a CCD drive circuit 35 for generating a CCD drive signal; a video signal processing circuit 37 for amplifying an electric signal from the CCD circuit, normalizing the signal level, and converting the signal into a digital signal; and an image data transfer circuit 39 for parallel-serial converting the video signal into an optical signal and transmitting the signal to a character recognition processor 41 of the recognition unit 11.

For the reflected light 20, the camera unit 5 includes: a color linear ray type CCD 30 for receiving an image focused by a color lens 27; a CCD circuit 32 for photo-electric conversion; a CCD drive circuit 33 for generating a CCD drive signal; a video signal processing circuit 36 for amplifying an electric signal from the CCD circuit 32, normalizing the signal level, converting the signal into a digital signal, and outputting a data which has been subjected to a light distribution/color correction processing; and a color image data transfer circuit 38 for parallel-transferring the video signal to outside. The video signal processing circuit 36 is a part of the image correction means.

Moreover, the camera unit 5 includes a correction error display LED (light emission diode) 44 for receiving a correction error signal from the recognition unit 11 and displaying the correction error.

Figure 4:
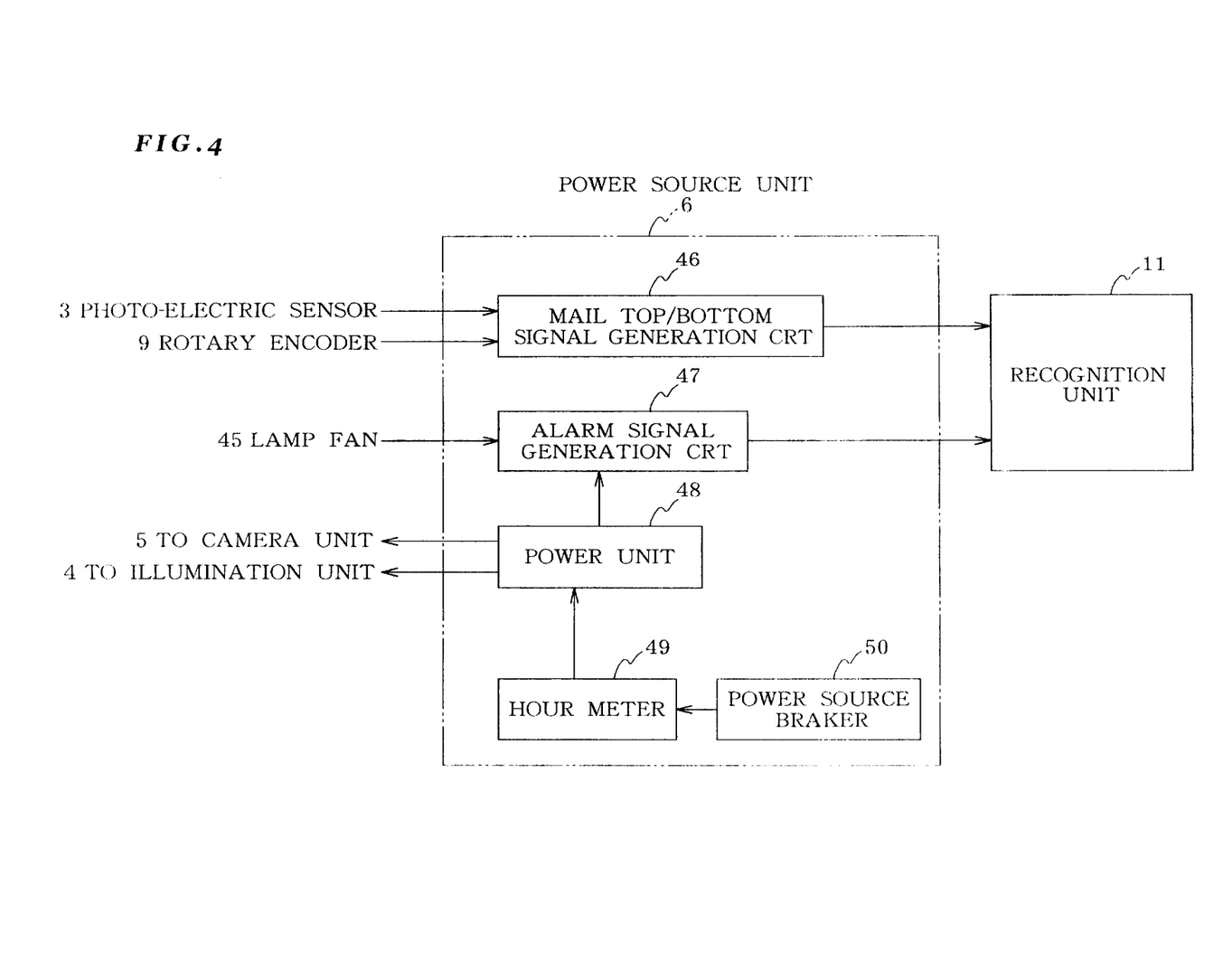
FIG. 4 is a block diagram showing a configuration of a power source unit of FIG. 1.

As shown in FIG. 4, the power source unit 6 includes: a mail top and bottom signal generation circuit 46 for externally outputting a signal of the photo-electrical sensor with a predetermined delay according to the pulse generated by the rotary encoder 9; an alarm signal generation circuit 47 for detecting various alarms including a lamp fan 45 and outputting it to outside; a power source 48; an hour meter 49 for displaying an accumulated time of electricity application for maintenance; and a power source breaker 50.

The recognition unit 11 includes: a character recognition block 41 for performing a character recognition processing for the monochromatic image data from the monochromatic image data transfer circuit 39; an address area detection block 42 for performing an address area detection processing for the color image data from the color image data transfer circuit 38 and transmitting the detected address area information 43 to the character recognition block 41; and a light distribution/color correction data generation block 40 for performing a light distribution/color correction to a reference signal transmitted from the color video signal processing circuit 36 upon generation of a correction data, and storing the corrected data in the video signal processing circuit 36.

Next, explanation will be given on the operation of the first embodiment. As shown in FIG. 1, the postal matter 2 in an inclined state is fed on the feed belt 1 at a constant speed of 1.5 m/s. The image take-in timing by the signal from the transmitting type photo-electric sensor 3 arranged in front of the camera field of view 12 is fed via the power source unit 6 to the recognition unit 11.

The postal matter 2 which has passed by the photo-electric sensor 3 and reaches the camera field of view 12 is picked-up as follows while passing through the camera field of view.

Two of the illumination units 4 illuminate a field of view with a necessary depth of field (for example, 50 mm) and a uniform light distribution while maintaining a constant luminance. The illumination units 4 are arranged so as to illuminate with approximately 45 degrees to sandwich the camera optical axis. This arrangement reduces the shade by protrusions and indentation of the object and mirror reflection due to a vinyl envelope.

As shown in FIG. 3, the reflected light 20 (or 21) from the surface of the postal matter 2 is reflected twice by a mirror 22 for refracting the optical path and then focused by the lens 27 (or 28) on the CCD 30 (or 31).

The mirror 22 is used to prolong the optical path within a limited space and suppress the image magnification fluctuation. In this embodiment, two of the mirrors 22 are arranged in such a manner that the optical path of the reflected light 21 for taking-in as a monochromatic image and an optical path of the reflected light 20 for taking-in as a color image are almost symmetric at right and left and the optical paths are changed their directions four times, respectively, so as to save the space. Moreover, since the light from the illumination unit 4 has a strong intensity, there is an advantage that even the thickness of the flat mail fluctuates to a certain degree, the fluctuation of the luminance on its surface is small.

As shown in FIG. 3, in front of each of the lenses 27 and 28, there are arranged a shading correction plate 26, a polarization filter 24, and an infrared ray cut filter 25. Furthermore, a color correction filter 23 is arranged in front of the color-mode lens 27.

The shading correction plate 26 has a hemispherical shape, for example and reduces the light in the center portion of a light flux and corrects the shading (luminance irregularity) due to the characteristic of the lens itself. It is possible to utilize a neutral density filter in which concentration is reduced from the center toward the outer circumference.

The infrared ray cut filter 25 cuts off the infrared rays in the near infrared rays remaining in the illumination light so as to enhance the contrast of a character written by an ink reflecting near infrared light rays such as ball-point pen.

The polarization filter 24 assures an image contrast by suppressing the mirror reflection from a postal matter wrapped in a vinyl material or the like easily causing a mirror reflection.

The color correction filter 23, in case of a high pressure sodium lamp of a high luminance orange color, passes the colors from blue to green as they are and reduces the light of only the red component. This color correction filter 22 is arranged for roughly adjusting the color balance. It should be noted that the color correction includes not only the adjustment of the color balance but also the correction of the color temperature.

For example, the monochromatic-mode lens 28 is selected to have a magnification of resolution 8.6 lines/mm in the scan direction and the color-mode lens 27 is selected to have a magnification of resolution 4.3 lines/mm in the scan direction, and both of the lenses are selected to take in the field of view 300 mm. Then, in the monochromatic CCD 31, 2580 pixels (=8.6 (pixels/mm)×300 mm) are actually used, and in the color CCD 30, 1290 pixels (=4.3 (pixels/mm)× 300 mm) are actually used. It should be noted that the "scan direction" is the vertical direction in FIG. 1 and this is the linear field of view in the pickup means, which orthogonally intersects the feed direction of the feed belt 1. The resolution of 8.6 lines/mm in the monochromatic CCD 31 is sufficient for a character recognition. Moreover, the resolution of 4.3 lines/mm in the color CCD 30 is sufficient for the area detection.

The CCD 31 (or 30) converts the light focused by the lens 28 (or 27) into an electric signal.

For cost reduction, a general-purpose CCD having the number of pixels greater than the aforementioned number actually used is used. In order to increase the resolution in the feed direction, the exposure time is set to the all pixel transfer time or below. Here, in order to avoid deterioration of the image quality due to a start of next exposure during feed of a pixel exposed, a shading plate 29 as shading means is used so as not to expose pixels other than the one actually used.

Here, a light leak is caused by diffraction through a space between the shading plate and the CCD and a slight exposure occurs at the end portion of the shading plate. To cope with this, in addition to actually used pixels, a part of reserved pixels adjacent to the actually used pixels is also transferred as an empty transfer. As a result, the actual exposure time is a sum of the time required for the actually used pixels added by the pixels of the empty transfer. The reserved pixels subjected to the light leak are processed as empty data (margin) and no exposure overlap is caused.

The video signal output form the monochromatic CCD circuit 34 is converted by A/D in the monochromatic-mode video signal processing circuit 37.

Figure 5:
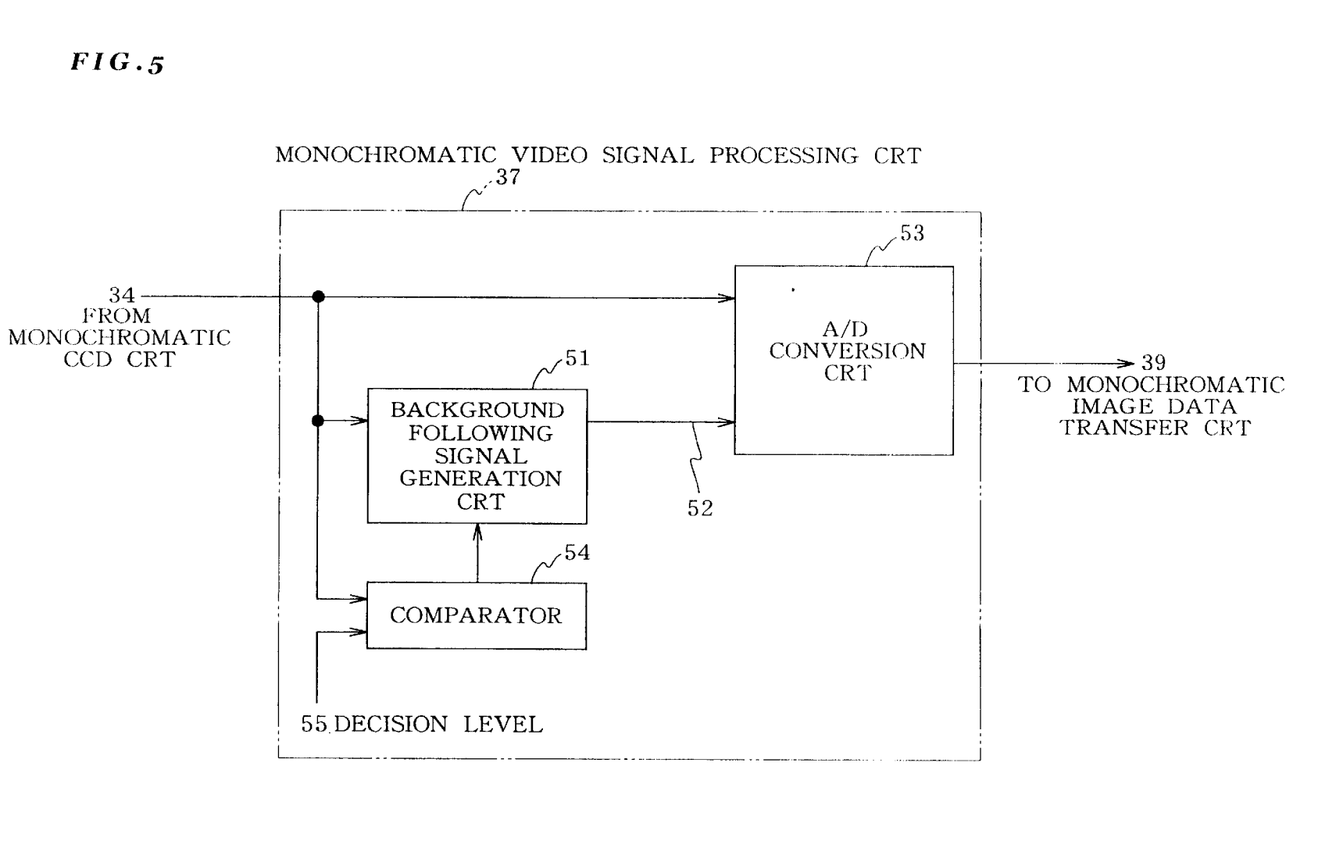
FIG. 5 is a block diagram showing a configuration of monochromatic video signal processing circuit of FIG. 3.

As shown in FIG. 5, a reference level 52 for digitizing by the A/D conversion circuit 53 uses an output signal from a background following signal generation circuit 51 for generating a paper surface level envelope. This enables to correct luminance irregularities on the papers surface due to illumination irregularities and lens shading and to obtain an image of uniform luminance. The background following signal generation circuit 51 constitutes a part of the envelope detection means.

Figure 6A:
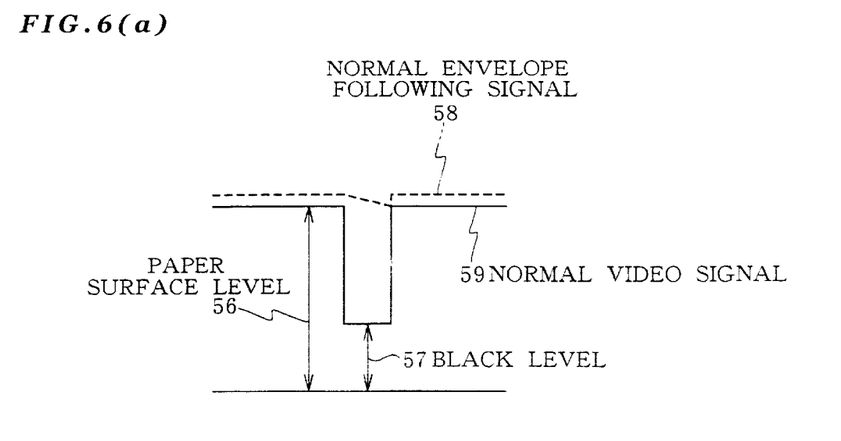
FIG. 6(a) shows a waveform indicative of the relationship between a video signal and an envelope follow-up signal in case of a normal diffused light.

As shown in FIG. 6(a), when a normal diffused light is taken in, the envelope following signal 58 following the video signal 59 to serve as the A/D conversion reference level 52 has a time constant sufficiently long not to follow black levels 57 scattered with respect to the paper surface level 56 and having a size almost identical to the size of characters. This enables to take in an image while almost maintaining the contrast between the paper surface and the black characters.

Figure 6B:
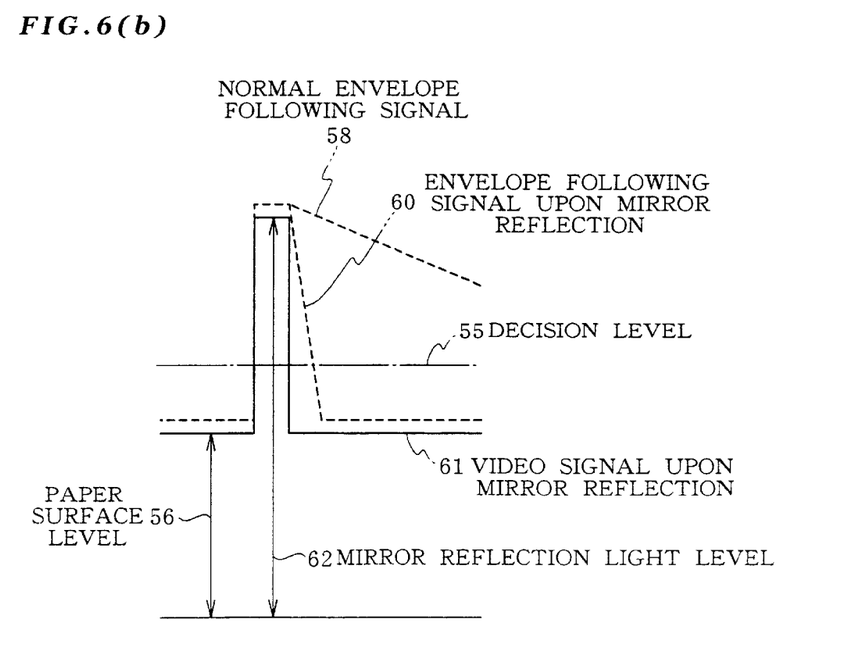
FIG. 6(b) shows a waveform indicative of the relationship between a vide signal and an envelope follow-up signal in case of a regularly reflected light.

However, as shown in FIG. 6(b), when a mirror reflection light passes through the polarization filter arranged not at a proper angle and is taken in, the video signal 61 has a level 62 by far greater than the paper surface level. In the case of the normal envelope following signal 58, after the light ray from the object returns to a diffused light of the normal paper surface level, it takes quite a time to be lowered to the paper surface level due to the long time constant. During this period of time, the reference level 52 is kept greater than the paper surface level 56 and accordingly the paper level itself has a contrast and appears like black. In the resultant image, the contrast in a dark portion is compressed and the contrast between the paper surface and the black characters is lowered.

To avoid this, when the envelope signal exceeds a certain critical level 55 higher than the paper surface level, it is detected by a comparator 54 and the mode is switched to reduce the time constant of the envelope. With this circuit configuration, when a mirror reflection light is incident, the envelope following signal 60 can be lowered to the normal paper surface level faster, thereby enabling to suppress the contrast deteriorated portion in the image to a shorter period of time. When the paper surface level 56 is lowered, a similar detection is performed to return to the normal time constant. This is the function of the correction means to cope with the mirror reflection.

The video signal output from the color CCD circuit 32 is A/D converted in the color-mode video signal processing circuit 36.

Figure 7:
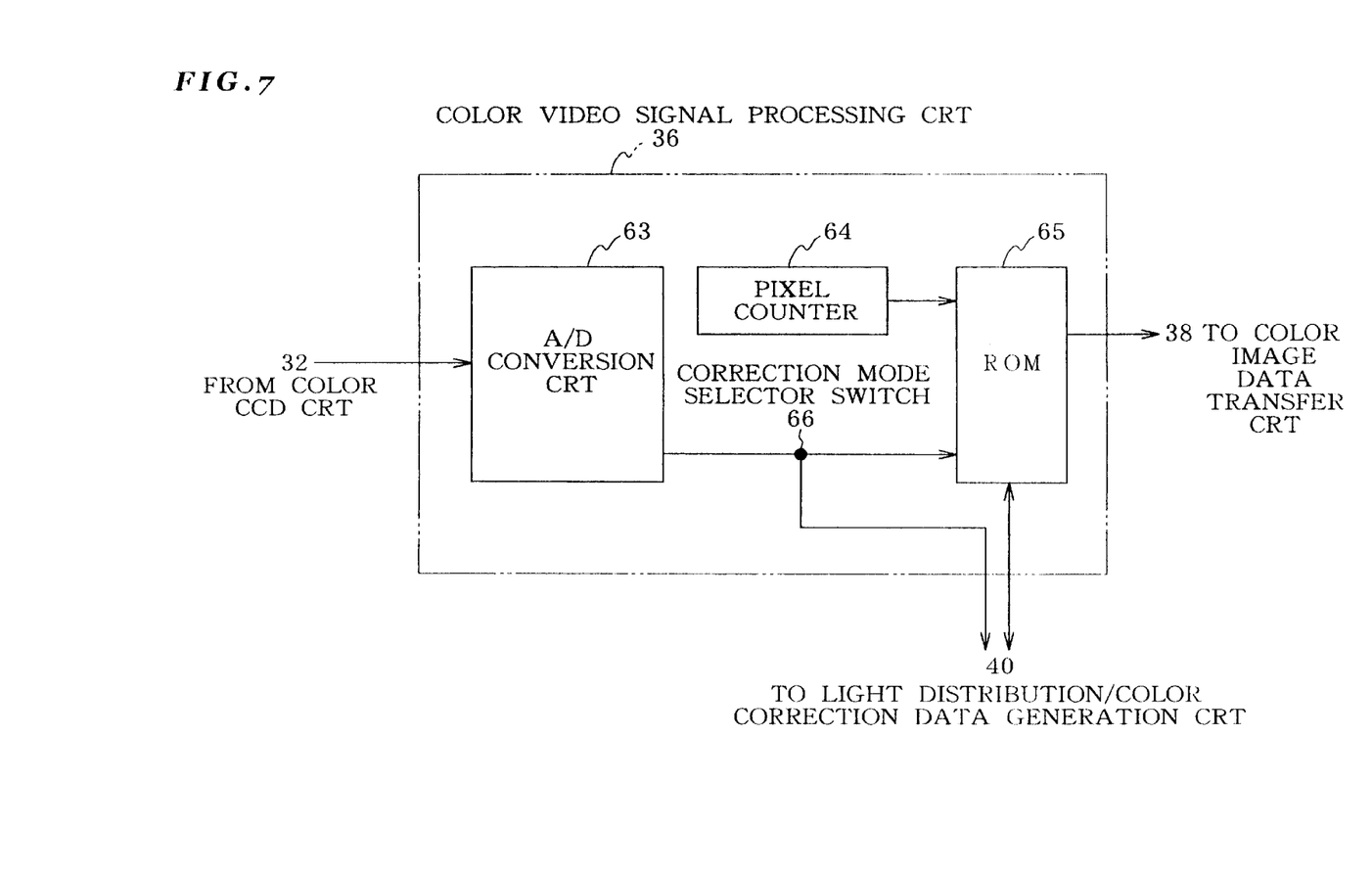
FIG. 7 is a block diagram showing a configuration of a color video signal processing circuit of FIG. 2.

As shown in FIG. 7, if the correction mode selector switch 66 is off, the image signal which has been digitized by the A/D conversion circuit 63 is input as an address value of a ROM 65 (storage device) writable in combination with a pixel counter value by the pixel counter and a correction data which has been written in beforehand is output.

Figure 8:
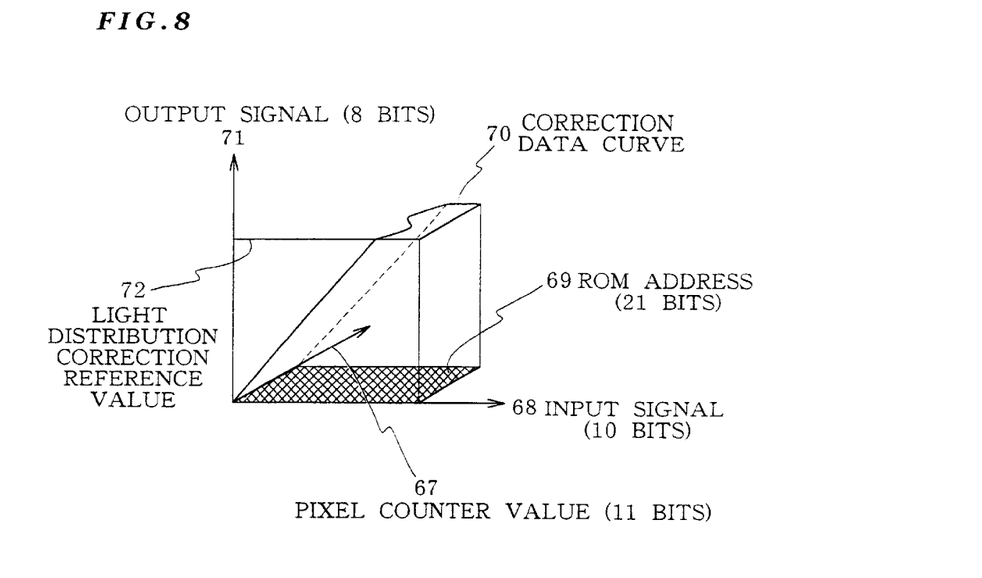
FIG. 8 explains input/output to/from a ROM of FIG. 7.

For example, as shown in FIG. 8, the counter value 67 of the pixel counter 64 is a 21-bit ROM address 69 consisting of most significant 11 bits for the counter value 67 of the pixel counter 64 and least significant 10 bits for the image input signal 68, and an 8-bit output signal 71 uniquely correspond to the ROM address via a correction data curved surface 70 is output.

This correction data curved surface 70 is determined by generation of light distribution/white correction data. For this, firstly, the correction mode selector switch 66 of the color-mode video signal processing circuit 36 in FIG. 7 is turned off. A particular white reference plate is arranged in the camera field of view 12 on the feed belt 1 which has been stopped and the image of the reference plate is taken in by the color-mode CCD 30. The video signal subjected to the A/D conversion is transmitted as a reference signal for performing light distribution/white correction to the light distribution/color correction data generation block 40 of the recognition unit 11.

Figure 9:
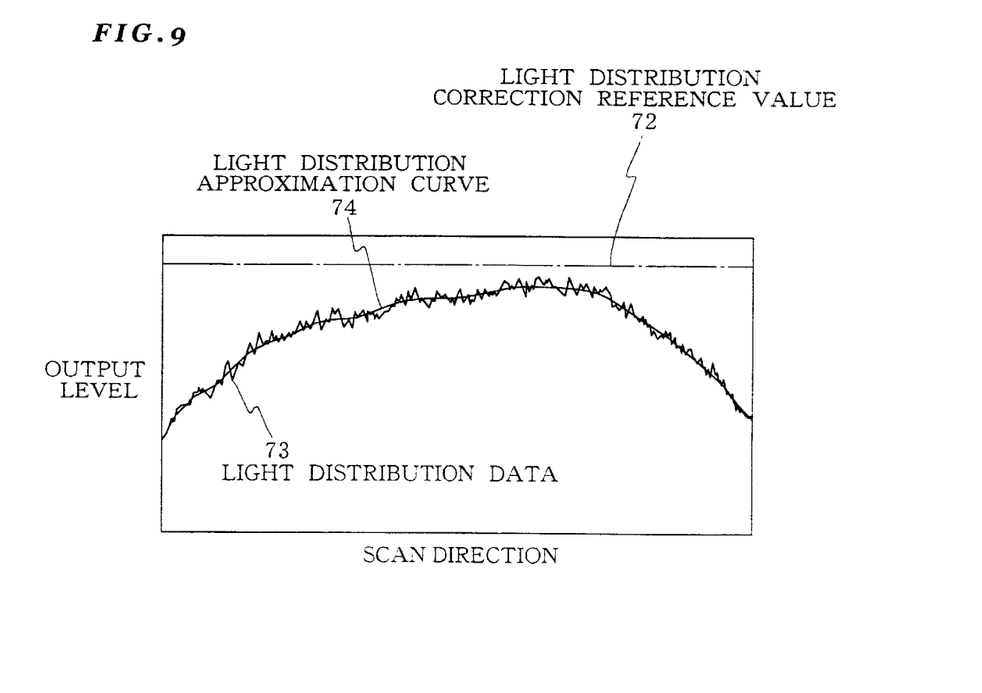
FIG. 9 explains the method for determining the light distribution correction data.

The light distribution/color correction data generation block 40 is supplied with, for example, data of several tens of lines. Firstly, a median processing is performed for smoothing between the several tens of lines for each of the colors so as to obtain a light distribution data 73 of a single-line scan after removing an electric noise for each line scan. Furthermore, as shown in FIG. 9, a median processing is performed to the line data so as to remove stains on the reference plate and distortion between pixels and obtain a curve 74 for smoothly approximating the light distribution configuration by using a spline interpolation.

If the light orientation approximation curve 74 obtained here has a maximum value equal to or greater than a predetermined first value or equal to or smaller than a predetermined second value or the ratio of the maximum value against a minimum value is 80% or below, a correction error is detected and the correction error display LED 44 of the camera unit 5 indicates that an error has occurred. This error detection function enables to know whether the reference plate is arranged not properly, the illumination lamp has been deteriorated by time and should be explained, or the lamp itself is out of the reference.

Then, a factor for matching the light distribution approximation curve 74 with the reference value 72, i.e., a factor for the light distribution correction and white correction is determined by a calculation function (program) of the correction data generation means. All data input are multiplied by the factor (correction data) to obtain a corresponding output data, which is written as a one-line LUT (look up table) to the ROM 65, thereby determining the correction data curved surface 70. This correction data is inherent to a position of each pixel and as has been described with respect to the ROM 65, on the LUT, each of the correction data (values on the correction data curved surface 70) is related via the pixel counter value to the input data to which this correction data is to be applied.

More specifically, for a pixel on the light distribution approximation curve 74, the following calculation is performed.

(output data)=(reference value 72)/(light distribution approximation curve 74)*(input data)

It should be noted that the input data may be any of all 10-bit values; the reference value 72 is a constant 8-bit value; the light distribution approximation curve 74 is 10-bit value on the curve; the output data is an 8-bit value calculated at the right side. However, as shown in FIG. 8, if the output data exceeds the reference value 72, the reference value 72 is used as the output data regardless of the input data. This processing is repeated each time an image data is taken in by correction data read-out means (program).

Here, by matching the reference value 72 of the respective colors, the white correction is performed simultaneously with the light distribution correction. The correction data to be written into the ROM 65 as the LUT and output may be, in addition to the 8 bits×3 colors, 4 bits×3 colors or 2 bits×3 colors.

By periodically performing the writing of this correction data into the ROM 65, it is possible to absorb the lowering of the color temperature of the illumination, the change of the light distribution by the time, and the like.

Moreover, the illumination unit used in the image input apparatus according to the present invention needs to illuminate a large volume range and accordingly, needs to use a high-power light source. For example, in case of a high pressure sodium lamp, two 150 W lamps are required. This causes a secondary heat due to heat radiation directly from the lamps and from the heated environment. Especially when a postal matter 2 made from a material easily absorbing heat is halted on the feed belt 1 for a long period of time, the postal matter 2 may be deteriorated. Moreover, the illumination unit 4, especially the lamp tube 76 (light source) may reduce its service life, shortening the frequent lamp exchange cycle to lower the maintenance condition.

In order to evade this, air is fed through the air duct 8 to the illumination unit 4 so that the illumination unit 4 is forced to be cooled.

Figure 10:
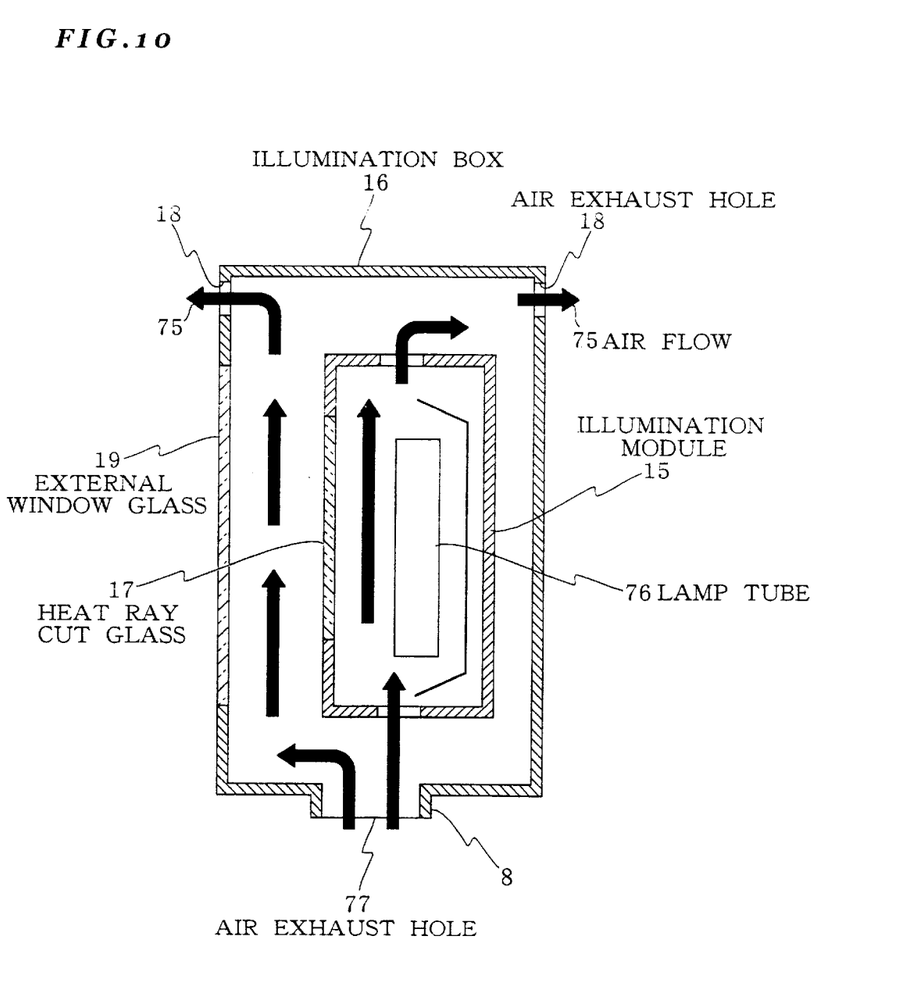
FIG. 10 shows an air flow in the illumination unit 4.

FIG. 10 shows an air flow for the illumination unit 4. A part of the air introduced from an air intake hole 77 of the illumination box 16 goes through the interior of the illumination module 15 to cool the lamp tube 76, the heat ray cut glass 17, and the module 15 and another part of the air goes by the exterior of the illumination module 15 to cool the heat ray cut glass 17 and the exterior of the illumination module 15. The air warmed is exhausted out of the illumination 4 through the air exhaust hole 18.

The heat ray cut glass 17 inside can cut and absorb the heat ray and the window glass 19 outside has a sufficiently low absorption of the heat ray. Accordingly, the secondary heat radiation due to temperature increase of the outer window glass 19 itself absorbing the remaining heat is small. With this cooling configuration, it is possible to suppress the heat radiation onto the feed belt 1 by the illumination unit 4 and to improve the maintenance condition of the illumination unit 4 itself.

It should be noted that the aforementioned values of the field of view, resolution, feed speed, and the like are given only as an example and the present invention is, not to be limited to these values.

Next, with reference to FIG. 11, explanation will be given on a second embodiment in which a monochrome optical path and a color optical path are identical in a first half of the optical paths from the pickup surface to the focusing means and are branched by optical path branching means arranged in the middle of the optical path to monochrome focusing means and color focusing means.

In this second embodiment, the camera field of view 12 for monochrome and that for color with respect to the postal matter 12 are completely matched unlike the first embodiment. As shown in FIG. 11, the optical system configuration in the camera unit 5 is different from that of the first embodiment.

Figure 11:
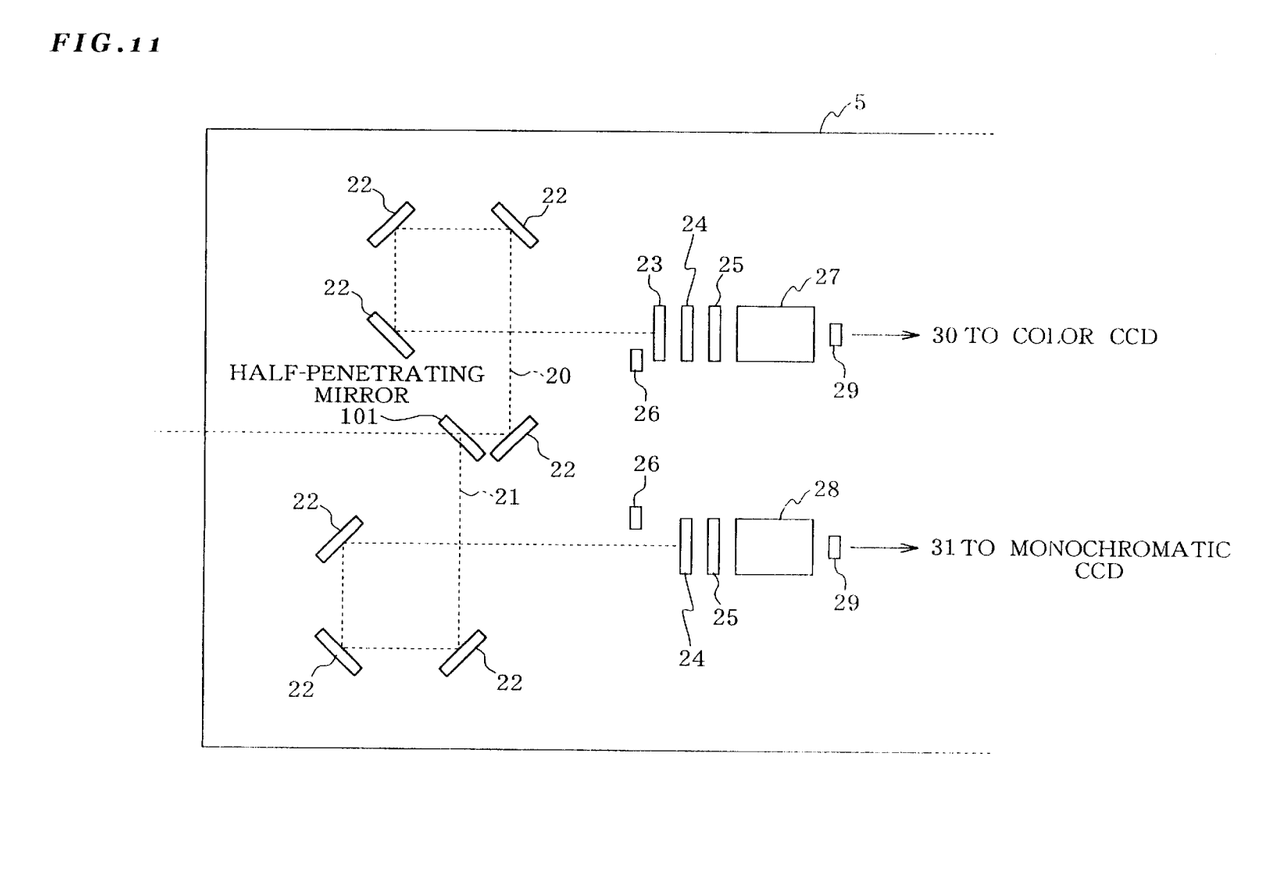
FIG. 11 is a lock diagram showing a configuration of an optical system according to a second embodiment of the present invention.

In FIG. 11, the camera optical axis 13 is vertical to the feed belt surface 1 and common to monochrome and color in the first half of the optical path from the pickup surface to the focusing means. A part of the reflected light from the postal matter 2 passes through a half-penetrating mirror 101 to become a penetrating light 20, which is reflected by four mirrors 22 to prolong the optical path before reaching the color-mode lens 27. Moreover, the other part of the reflected light from the surface of the postal matter 2 is reflected by the half-penetrating mirror 101 constituting the optical path branching means and becomes a reflected light 21, which is reflected by three mirrors 22 for prolonging the optical path before being focused by the monochromatic-mode lens 28.

Thus, the monochromatic and color fields of view are completely matched with each other. Accordingly, it is possible to perform the address area detection more accurately. In the first embodiment, when the postal matter 2 has a large thickness, the difference between the monochromatic field of view and the color field of view is increased. That is, the thickness of the postal matter 2 fed is limited. In contrast to this, in the second embodiment, the monochromatic optical axis and the color optical axis are completely matched and the axis is approximately vertical to the surface of the postal matter 2, assuring to cope with the thickness change of the postal matter 2.

Next, with reference to FIG. 12, explanation will be given on a third embodiment of the present invention.

In the third embodiment, the camera unit 5, and the illumination unit 4, the air supply unit 7, and the power source unit 6 of FIG. 1 are made into a unitary block. The configuration of the second embodiment is characterized in that the illumination means is realized by a single illumination unit 4, the optical axis 203 of the illumination unit 4 forms an acute angle against the feed direction 14 of the feed means, and the angle 204 is different from an angle 205 defines by the monochromatic and color optical axis 13 and the feed direction 14 of the feed means.

Figure 12:
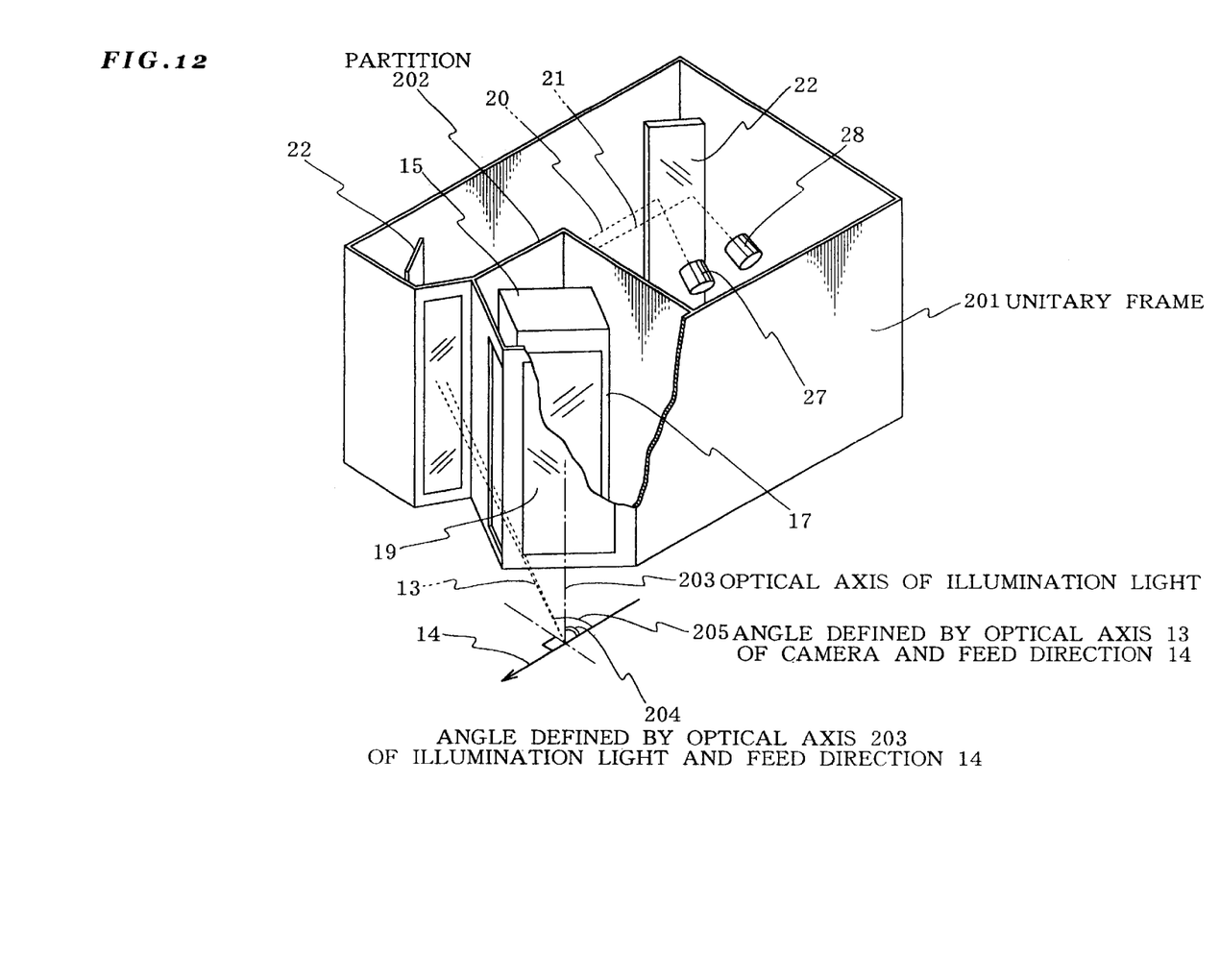
FIG. 12 is a perspective view showing a configuration of a third embodiment of the present invention.

As shown in FIG. 12, the module 15, the camera unit 5, and power source unit 6 similar to those of the first embodiment are built in a unitary frame 201. Here, the illumination module 15 is contained in a space defined by a partition 202. It should be noted that in FIG. 12, only the mirror 22, the monochromatic-mode lens 28, and the color-mode lens 27 are shown, omitting the other components of the camera unit 5 and the power source unit 6.

In the third embodiment, the optical axis 203 of the illumination light and the optical axis 13 of the camera are at an acute angle against the feed direction 14; and the angle 204 defined by the optical axis 203 of the illumination light and the feed direction 14 is smaller than the angle 205 defined by the camera optical axis 13 and the feed direction 14. This configuration can suppress an image deterioration such as halation due to a mirror reflection by a postal matter wrapped in a material easily causing a mirror reflection such as vinyl.

According to the image input apparatus of the present invention, a flat mail address area is detected by color information and the character recognition processing is performed only to that area, thereby enabling to classify flat mails with a high speed and a high accuracy.

Moreover, cooling means is provided for forcibly cooling the light source of the illumination means by generating an air flow. Accordingly, it is possible to use a high-output light source accompanies by heat rays such as a high pressure sodium lamp. The CCD exposure time for assuring a necessary S/N ratio can be reduced and the speed of a flat mail classification procedure is further increased. Furthermore, since it is possible to obtain an illumination depth of sufficient luminance, it is possible to handle flat mails having different thickness values.

When the illumination means is realized by a single member, the illumination means, the feed means, and the pickup means are arranged in such a manner that the optical axis of the illumination means forms an acute angle against the feed direction of the feed means and the angle is different from an angle defined by the monochromatic and color optical axis of the pickup means and the feed direction of the feed means. On the other hand, when the illumination means is realized by two members, the illumination members are arranged so as to sandwich the linear field of view of the pickup means. This enables to prevent halation or the like generated by light rays from the illumination means reflected by mirror reflection directly from an object on the feed means to enter the pickup means.

Furthermore, the monochromatic and color optical path are in proximity to each other or completely matched with each other. Accordingly, there is no operation is required for matching the monochromatic image and the color image taken in, thereby enabling to perform the address area detection and the character recognition with a higher speed.

Moreover, a plurality of mirrors are arranged for refracting the optical path in the pickup means, so as to prolong the monochromatic optical path and the color optical path within a limited space. This suppresses a magnification change caused by movement of the pickup surface, thereby enabling to cope with the flat mail thickness fluctuations and improve the character recognition accuracy.

Since the polarization filter and the infrared ray cut filter are arranged and the color correction filter is arranged on the color-optical path, it is possible to perform a character recognition process with a sufficient contrast even when the flat mail is wrapped in a material easily causing a mirror reflection and/or has an address written with ink such as a ball-point pen.

Furthermore, since the monochromatic pickup means has a resolution sufficiently high for a character recognition while the color pickup means has a low resolution sufficient for an area detection, it is possible to achieve both of reduction of the processing time required for the area detection and the character recognition and the accuracy of the character recognition.

Moreover, for monochromatic pickup and color pickup, separate focusing means, photo-electrical conversion means, video signal processing means, and image data transmission means are arranged. Accordingly, it is possible to perform the monochromatic image processing and the color image processing substantially simultaneously, thereby enabling to significantly reduce the processing time required for the area detection and the character recognition.

The photo-electrical conversion means is constituted by a linear array CCD, a part of which is shaded by the shading means so as to obtain a necessary linear field of view. Accordingly, it is possible to use CCD available on market to constitute the pickup means. This enables to reduce the cost of the apparatus. Moreover, since pickup is performed with a linear field of view, the data amount to be transferred can also be reduced, thereby enabling to increase the speed of the entire processing flow.

Furthermore, a monochromatic image is digitized by detecting a background luminance as a reference level by the envelope detection means. This enables to substantially eliminate the illumination irregularities of the illumination means and shading of the lens arranged in the pickup means, thereby enabling to obtain a clear image data and improve the character recognition accuracy. Moreover, the light distribution correction and the white correction are performed by the image correction means, which enables to properly perform the processing related to the area detection.

Moreover, the envelope detection means includes correction means for correcting distortion of a video signal when an object caused a mirror reflection, so that this correction means adjusts the time constant of the envelope. Accordingly, even when a mirror reflection increases the background luminance to lower the character contrast, the contrast can rapidly be corrected to a normal state, thereby improving the character recognition accuracy as a whole.

Furthermore, the image correction means includes: the correction data generation means for writing a correction data obtained using the reference plate as an object in the storage apparatus, and the correction data read-out means for reading out correction data for each image portion from the storage apparatus utilizing the address value corresponding to the object image. Accordingly, it is possible to automatically perform the light distribution correction and the white correction during an image take-in. This assures the area detection required for the character recognition.

Moreover, when an apparent error is present in the light distribution characteristic and the white balance, an error signal is output. Thus, it is possible to prevent generation of an error due to use of an improper correction data.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-057537 (Filed on Mar. 2, 2000) including specification, claims, drawings and summary are incorporated herein by reference in its entirety.

What is claimed is:

1. An image input apparatus comprising:
   feed means for feeding an object in a constant direction;
   illumination means having a light source for applying light rays toward the object fed by the feed means in the constant direction and a filter for cutting heat rays from the light source while allowing visible light rays to pass through;
   a pickup means for picking up the object illuminated by the light rays with a linear field of view intersecting the feed direction, the pickup means having a monochromatic pickup means and a color pickup means; and
   cooling means for forced cooling by generating an air flow between the light source of the illumination means and the filter,
   wherein the monochromatic pickup means has a high resolution appropriate for a character recognition and the color pickup means has a low resolution appropriate for a character area detection.

2. The image input apparatus as claimed in claim 1, wherein the illumination is realized by a single illumination unit having an optical axis forming an acute angle against the feed direction of the feed means, which angle is different from an angle defined by the monochromatic and color optical axis of the pickup means and the feed direction of the feed means.

3. The image input apparatus as claimed in claim 1, wherein the illumination means is realized by two illumination units which are arranged so as to sandwich the linear field of view of the pickup means.

4. The image input apparatus as claimed in claim 1, wherein the illumination means uses as the light source a high pressure sodium lamp.

5. The image input apparatus as claimed in claim 1, wherein the pickup means has a monochromatic optical path and a color optical path which are approximately vertical to the feed direction of the feed means and are positioned in the proximity to each other along the feed direction of the feed means.

6. The image input apparatus as claimed in claim 1, wherein the pickup means has a monochromatic optical path and a color optical path which are overlapped in a first half of the optical path from the pickup surface to the focusing means and are branched by optical path branching means so as to be introduced to monochromatic focusing means and color focusing means of the pickup means, respectively.

7. The image input apparatus as claimed in claim 1, wherein the pickup means includes a plurality of mirrors for reflecting the optical paths so as to prolong the monochromatic optical path and the color optical path within a limited space.

8. The image input apparatus as claimed in claim 1, wherein the pickup means includes a polarization filter and a infrared ray cut filter which are arranged in the monochromatic optical path, and a color correction filter, a polarization filter and an infrared ray cut filter which are arranged in the color optical path.

9. The image input apparatus as claimed in claim 1, wherein the pickup means has its monochromatic field of view and color field of view having an identical width.

10. The image input apparatus as claimed in claim 1 wherein the pickup means includes independent focusing means, photo-electric conversion means, video signal processing means, and image data transfer means for each of the monochromatic pickup and the color pickup.

11. The image input apparatus as claimed in claim 10, wherein the photo-electric conversion means includes a first linear array CCD consisting of light receiving elements arranged in a straight line for monochromatic image pickup and a second linear array CCD consisting of light receiving elements arranged in a straight line for color image pickup, and further includes shading means for shading a part of the monochromatic and color linear array CCD.

12. The image input apparatus as claimed in claim 10, wherein the video signal processing means includes a monochromatic mode video signal processing means and a color mode video signal processing means, wherein the monochromatic mode video signal processing means includes envelope detection means and analog/digital conversion means, and the color-mode video signal processing means includes analog/digital conversion means and image correction means.

13. The image input apparatus as claimed in claim 12, wherein the envelope detection means includes correction means for correcting distortion of a video signal when the object caused mirror reflection.

14. The image input apparatus as claimed in claim 12, wherein the image correction means includes correction data generation means for calculating a correction data with respect to a reference signal which has been converted into a digital signal by the photo-electric means and the analog/digital conversion means using a reference plate as the object and writing the calculation result into a storage device.

15. The image input apparatus as claimed in claim 14, wherein the image correction means includes correction data read-out means for reading out the correction data from the storage device using object image data which has been converted into a digital signal by the analog/digital conversion means, as part of an address value of the storage device.

16. The image input apparatus as claimed in claim 14, wherein the correction data generation means includes a calculation function to perform a smoothing process to remove stains on the reference plate and noise of a circuitry from the reference signal for a curve approximation process of the illumination light distribution characteristic and to unify the reference values after the correction for respective colors, thereby simultaneously performing the light distribution correction and the white correction.

17. The image input apparatus as claimed in claim 16, wherein the calculation function includes an error detection function for detecting irregularities of the light distribution characteristic obtained by the curve approximation to detect an error of the reference plate and the circuitry and output an error signal.

18. The image input apparatus as claimed in claim 16, wherein the correction data generation means performs the smoothing process for noise removal by a median processing and the curve approximation process of the light distribution characteristic by a three-dimensional spline interpolation.

19. An image input apparatus comprising:
   a feeder, the feeder feeding an object in a constant direction;
   a light source, the light source illuminating the object;
   a filter disposed between the light source and the object, the filter filtering heat rays emanating from the light source while allowing visible light rays to pass through the filter;
   a monochromatic image detection device, the monochromatic image detection device adapted for character recognition and detecting images on the object;
   a color image detection device, the color image detection device adapted for character area detection and detecting images on the object;
   wherein the monochromatic image detection device is capable of a higher resolution than the color image detection device.

20. The image input apparatus as claimed in claim 19, wherein the monochromatic image pickup device includes at least one mirror to prolong an optical path within the monochromatic pickup device, and the color image pickup device includes at least one mirror to prolong an optical path within the color image pickup device.

21. The image input apparatus as claimed in claim 19, further comprising:
   a cooling device generating an airflow between the light source and the filter.

* * * * *